United States Patent
Santella et al.

(12) 
(10) Patent No.: US 6,544,668 B1
(45) Date of Patent: Apr. 8, 2003

(54) DUCTILE FILLER METAL ALLOYS FOR WELDING NICKEL ALUMINIDE ALLOYS

(75) Inventors: Michael L. Santella, Knoxville; Jeffrey D. McNabb, Lenoir City; Vinod K. Sikka, Oak Ridge, all of TN (US)

(73) Assignee: U. T. Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/396,038

(22) Filed: Sep. 15, 1999

(51) Int. Cl.$^7$ ............................................. B32B 15/01
(52) U.S. Cl. .................... 428/680; 219/146.22; 219/50; 148/426; 148/428; 420/441; 420/442; 420/445; 420/447; 420/449; 420/451; 428/637; 428/939; 228/101; 228/262.3
(58) Field of Search ................................. 428/680, 637; 420/441, 442, 445, 449, 460, 447, 451; 148/426, 427, 428, 429; 219/146.22; 228/101

(56) References Cited

U.S. PATENT DOCUMENTS 5,413,876 A * 5/1995 Santella et al. ............. 428/680
5,725,693 A * 3/1998 Santella et al. ............. 148/428

FOREIGN PATENT DOCUMENTS

JP        7-238334    * 9/1995
JP        10-193210    * 7/1998

* cited by examiner

*Primary Examiner*—Robert R. Koehler
(74) *Attorney, Agent, or Firm*—John B. Hardaway, III; Hardaway/Mann IP Group

(57) ABSTRACT

Nickel aluminum alloys are welded utilizing a nickel based alloy containing zirconium but substantially free of titanium and niobium which reduces the tendency to crack.

3 Claims, 1 Drawing Sheet

DUCTILE FILLER METAL ALLOYS FOR WELDING NICKEL ALUMINIDE ALLOYS

The U.S. Government has rights in this invention pursuant to contract No. DE-AC05-96OR22464 between the Department of Energy and Lockheed Martin Energy Research Corporation.

BACKGROUND OF THE INVENTION

This invention relates generally to the art of alloys, and more particularly to the art of welding alloys.

Conditions of very high mechanical restraint can be encountered in welding, for instance, when depositing the root bead of a single-vee weld of pipes. Another condition where high mechanical restraint can occur is when making deep, localized repair welds. These conditions promote cracking in weld deposits especially for filler metals that have high strength and low ductility. Conditions of high mechanical restraint can be encountered when making either structural or repair welds of nickel aluminides. Cracking of such weld deposits is observed and it can be difficult or impossible to control with the normal filler metals used for nickel aluminide alloys. Cracking problems under high mechanical restraint conditions are overcome with the use of the high ductility filler metals that are the subject of this invention disclosure.

The two filler metals being used to weld nickel aluminide alloys are designated IC221W, U.S. Pat. No. 5,413,876, and IC221LA U.S. Pat. No. 5,725,693. The nominal composition of the IC221W alloy is Ni-8A1-7.7 Cr-1.5 Mo-3.1 Zr-0.003B wt %. The Ni-8A1-7.7 Cr wt % base composition of IC221W is identical to that of the base metal cast nickel aluminide alloys, i.e. IC221M and IC396M. IC221W is more resistant to solidification cracking than the base metal alloys and this is a critical property for obtaining crack-free welds with ICC221W filler metal. Because IC221W shares the same base composition with the base metal alloys it also closely matches their properties of high strength and relatively low ductility.

The nominal composition of the IC221LA alloy is Ni-16 Cr-4.5-Al 1.2 Mo-1.5 Zr-0.003B wt %. The chemical composition of this alloy was formulated to match those of the base alloys, but the chromium level was increased and the aluminum level was decreased to improve its ductility. The improved ductility properties of IC221LA make it the filler metal alloy of choice for most welding applications.

The cast nickel aluminide alloys could not be welded before the developments of the IC221W and IC221LA filler metal alloys. However, a need still exists for filler metal alloys that are chemically compatible with the base metal alloys and which have even higher ductility than that of the IC221LA filler metal alloy and for welding alloys that can withstand conditions of high restraint.

SUMMARY OF THE INVENTION

It is thus an object of this invention to provide a novel alloy.

It is a further object of this invention to provide a novel welding alloy.

It is a yet further and more particular object of this invention to provide a welding alloy for nickel aluminide alloys and to form a composite thereof.

These as well as other objects are accomplished by a substantially titanium and niobium free alloy comprising nickel and zirconium.

BRIEF DESCRIPTION OF THE DRAWINGS

The single FIGURE of drawing is a perspective view of a composite article formed in accordance with this invention.

DETAILED DESCRIPTION

Figure 1:
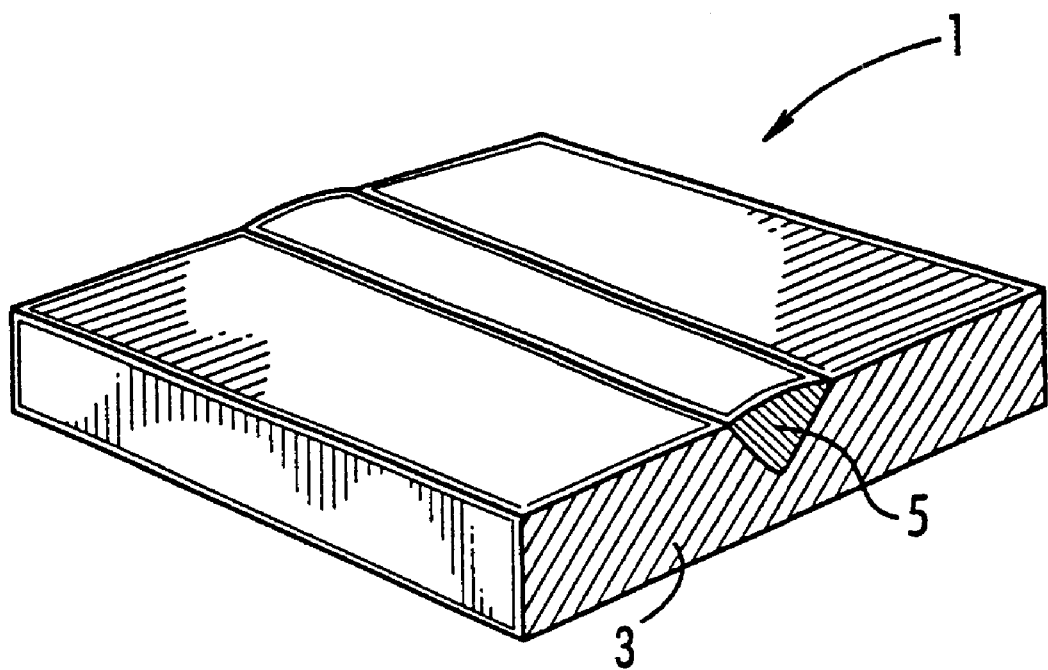

The nickel based alloy of this invention contains zirconium and has a preferred composition of 1–3 wt. % zirconium, 0–3 wt. % aluminum, and 0–20 wt. % chromium, with the balance being nickel.

In accordance with this invention it has been found that a nickel alloy which is substantially free of titanium and niobium may be utilized to weld nickel aluminide alloys without cracking. Various other advantages and features will become apparent from the following description given with reference to the figure of drawing.

The figure illustrates a composite article, 1 showing a nickel aluminide alloy, 3 having a weld, 5 therein formed from the alloy of this invention. Various examples thereof will be discussed in the description which follows.

Alloy formulations in accordance with this invention are shown in Table 1.These alloys exhibit the ability to produce crack-free weld deposits in otherwise problematic conditions. Nickel aluminide trunnions were welded to a nickel aluminide roll shell to produce a transfer roll assembly for a heat-treating furnace. The welds were circumferential single-vee groove welds with a nominal thickness of ½". One of the trunnions was welded to the roll shell completely with IC221LA and no unusual problems.

TABLE I

| | Composition, wt % | | | |
|---|---|---|---|---|
| Melt ID | Ni | Al | Cr | Zr |
| 16513 | Bal. | — | — | 1 |
| 16514 | Bal. | — | — | 3 |
| 16516 | Bal. | 3 | 20 | 2 |
| 16810 | Bal. | — | 20 | 1.5 |

During the welding of the second trunnion, two cracks developed in the root bead weld deposit. One of these cracks, about 9" in length, was rewelded twice with IC221LA, but it continued to crack. A similar situation was encountered in a second area of the root bead that was about 4" in length. Both of the problem areas were then welded with the Ni-1Zr alloy (melt -no. 16513. In both cases, the repair weld sections made with Ni-1Zr filler metal were free of cracks. After the entire root bead was crack-free, this weld was completed with IC221LA filler metal.

In another example a weld-edge preparation of the trunnions and roll shell was changed to reduce machining costs. However, this change in weld-edge preparation raised concerns about making the root bead weld deposit more susceptible to cracking.

One of the root beads was made with the Ni-1Zr filler metal alloy; the second was made with the Ni-20 Cr-1.5Zr filler metal alloy. No problems were encountered with either of the root bead weld deposits and they were crack-free.

In addition to these two roll assemblies, numerous test articles were welded with these filler metal alloys in the laboratory. The Ni-1Zr and Ni-20 Cr-1.5Zr filler metal alloys are especially resistant to cracking. The ability to resist cracking was verified numerous times for deep, highly restrained repair welds.

Another important feature of both filler metal alloys is that they can be used to weld the cast nickel aluminide alloys to other engineering alloys including carbon steel, stainless steel, and other heat resistant alloys. For example, the Ni-1Zr filler metal was used to make a single-vee groove weld of carbon steel plate welded to cast IC221M. The weld thickness was nominally ½". The plates were restrained for welding and the weld deposit was free of defects according to radiographic examination.

In a third example, ductile filler metals of this invention were used to fabricate transfer roll assemblies. In this example an assembly was made of a nickel aluminide roll shell and trunnions of a heat resistant stainless steel designated HK alloy. The HK trunnions were actually being recycled from a roll assembly made entirely of this alloy, but that had failed in service. Recycling of the HK trunnions is of interest because of its potential for decreasing the cost of roll assemblies while providing the superior properties of a nickel aluminide roll shell. For this fabrication, Ni-20 Cr-1.5Zr filler metal alloy was used together with IC221LA to produce the desired welds. Preliminary tests indicated that the use of the Ni-20 Cr-1.5Zr alloy was mandatory for welding HK to IC221M. Welds made entirely with IC221LA or entirely with RA333, the filler metal recommended for HK alloy, always cracked.

Even though the IC221LA and IC221W filler metals are effective for welding the cast nickel aluminide alloy, the need for the filler metals with higher ductility was apparent. During the course of dealing with problem areas of groove welds and repair welds a variety of commercially available ductile filler metals was evaluated. Some of these alloys are shown in Table 2. Several of these alloys are widely recommended and used for the same purposes as the Ni-1Zr and Ni-20 Cr-1.5Zr filler metal alloys. For example, the Ni200, Ni99, and Ni61 alloys all contain high nickel concentrations, and each was evaluated for welding cast nickel aluminide alloys. However, none of them consistently produced crack-free weld deposits. Ni99 and Ni66 both contain titanium additions, which help to control solidification cracking in weld deposits on conventional nickel based alloys.

This invention, however, shows that Ti concentrations above trace amount (>about 0.1 wt. %) promote cracking in the nickel aluminide alloys. Ti additions in Ni61 and Ni99 filler metals are responsible for their tendency to crack when used for welding the nickel aluminide alloys. In contrast, work to develop IC221W and IC221LA showed that zirconium additions are critical to preventing cracks during the welding of nickel aluminides.

Ductile commercial filler metal alloys evaluated for welding cast nickel aluminide alloys are described in the following table:

TABLE II

| Alloy | Composition, wt % | | | | | | | |
|---|---|---|---|---|---|---|---|---|
| | Ni | Cr | Al | Mo | Ti | Nb | Fe | Others |
| I617 | 55 min. | 20–24 | 0.8–1.5 | 8–10 | 0.6 max. | — | 3 max. | Bal. |
| I625 | 58 min. | 20–23 | 0.4 max. | 8–10 | 0.4 max. | 3.15–4.15 | 5 max. | Bal. |
| I718 | 50–55 | 17–21 | 0.2–0.8 | 2.8–3.3 | 0.65–1.15 | 4.75–5.5 | Bal. | — |
| I82 | 67 min. | 18–22 | — | — | 0.75 | 2–3 | 3 max. | Bal. |
| Ni | 100 | | | | | | | |
| Ni 99 | 99 min | | | | 1 max. | | | Bal. |
| Ni 61 | 93 min. | — | 1.5 max. | — | 2–3.5 | — | 1 max. | Bal. |
| C276 | 58 min. | 14.5–16.5 | — | 15–17 | — | — | 4–7 | Bal. |
| Hast. S | Bal. | 15 | 0.25 | 14.5 | — | — | 0.4 | Bal. |
| SS308 | 9–11 | 19.5–22 | — | 0.75 max. | — | — | Bal. | — |

Another widely used filler metal for conditions of high restraint, unusual problems of cracking, and for dissimilar joints is I82 alloy. This alloy is based on Ni-20 Cr, but it also contains a significant concentration of niobium that is used to control solidification cracking. Our experiments also show that Nb is an undesirable addition to nickel aluminides because for these alloys Nb promotes rather than prevents cracking. None of the filler metals shown in Table II is capable of producing acceptable weld deposits on nickel aluminide alloys.

It is thus seen that the alloy of this invention is novel, performs well under conditions of mechanical restraint and is effective for welding nickel aluminide alloys.

As various modifications will become apparent from a reading of the above description which is exemplary in nature, such modifications are embodied within the scope of this invention as defined by the following appended claims.

What is claimed is:

1. A ductile filler metal alloy for welding nickel aluminum alloys comprising:

a nickel based alloy consisting essentially of 1–3 wt. % zirconium, aluminum, being present in an amount up to 3 wt. %, about 20 wt. % chromium, and being substantially free of titanium and niobium.

2. In a process for welding nickel aluminum alloys, the improvement comprising:

welding utilizing a ductile welding alloy comprising a nickel based alloy consisting essentially of 1–3 wt. % zirconium being present in an amount up to 3 wt. %, aluminum about 20 wt. % chromium and being substantially free of titanium and zirconium.

3. A composite article comprising a nickel aluminide alloy having a weld therein formed from a ductile metal alloy, comprising:

a nickel based alloy consisting essentially of 1–3 wt. % zirconium, aluminum being present in an amount up to 3 wt. %, about 20 wt. % chromium and being substantially free of titanium and niobium.

* * * * *